United States Patent [19]

Erb

[11] 4,094,072
[45] June 13, 1978

[54] GOLF CLUB FIXTURE

[76] Inventor: C J Erb, 22621 Beech, Dearborn, Mich. 48124

[21] Appl. No.: 767,804

[22] Filed: Feb. 11, 1977

[51] Int. Cl.² .............................................. G01B 5/24
[52] U.S. Cl. .................................... 33/174 F; 72/293
[58] Field of Search .................. 33/1 N, 174 F, 195; 72/293, 316; 273/32 R, 32 B, 162 F

[56] References Cited

U.S. PATENT DOCUMENTS

| 2,546,426 | 3/1951 | Bryant | 33/174 F |
| 2,973,581 | 3/1961 | Rhodehamel | 33/174 F |
| 3,439,429 | 4/1969 | Sundstrom | 33/174 F |
| 3,822,477 | 7/1974 | Collins | 33/174 F |

Primary Examiner—Richard E. Aegerter
Assistant Examiner—Richard R. Stearns
Attorney, Agent, or Firm—Jay C. Taylor

[57] ABSTRACT

A fixture to facilitate measuring and adjusting the loft and lie angles of a golf club or iron comprises a guide having a plane indexing surface pivotally adjustable to various standard loft angles, and having upper and lower shoes for clamping the head of the club therebetween in predetermined alignment whereat the score lines on the club face are horizontal, the face is flush with the indexing surface, and the sole of the head is seated on the lower shoe at only two locations adjacent the rounded junctures respectively of the sole with the heel and toe of the head, the latter location being elevated with respect to the former. The upper shoe is movable parallel to the indexing surface toward the lower shoe in the clamping action, has a rounded cam engageable with only a mid-location of the top edge of the head for camming the head toward the indexing surface and lower shoe, and has limited universal lost motion for adjusting the cam to the angle of the top edge during the clamping action. A protractor selectively movable with respect to the club shaft has a loft angle indicator pivotal about a horizontal axis into parallelism with the shaft for indicating the deviation from a standard loft angle, and has a lie angle indicator pivotal on the loft indicator into parallelism with the shaft for indicating the lie angle.

15 Claims, 5 Drawing Figures

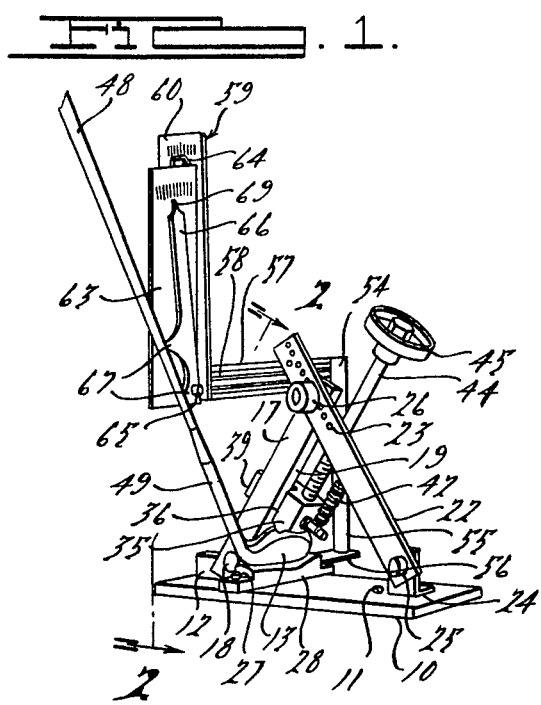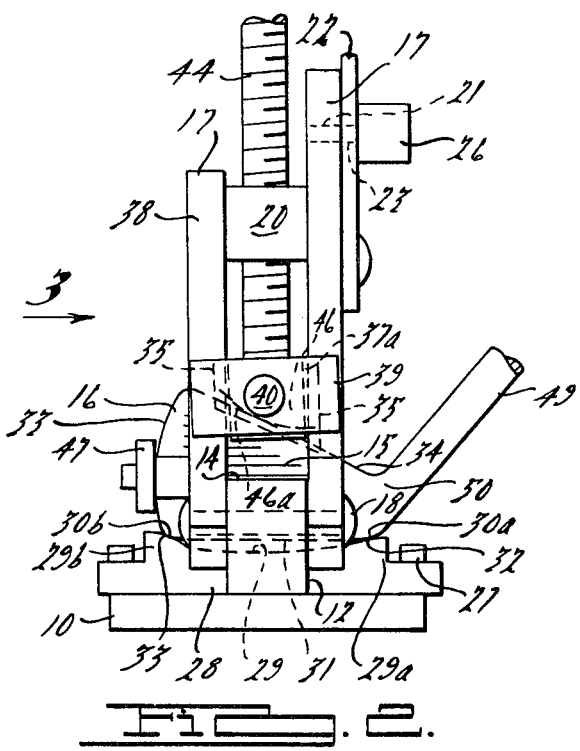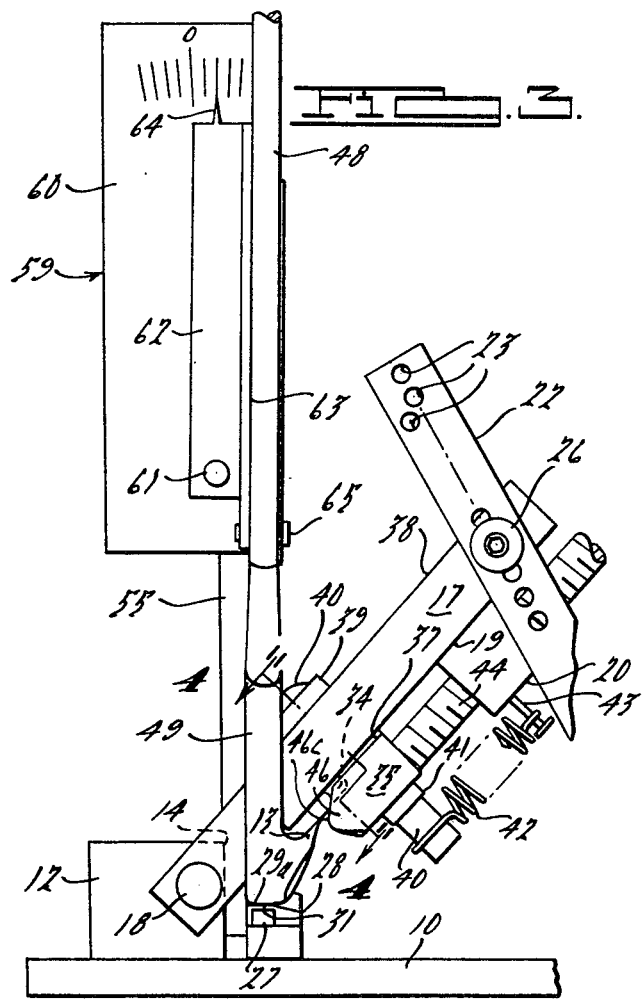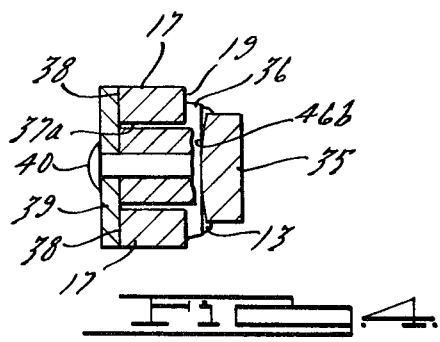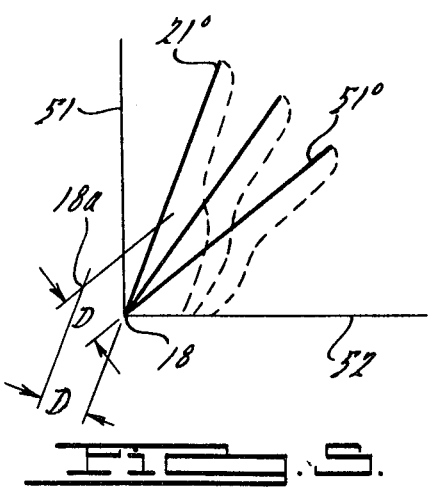

GOLF CLUB FIXTURE

BACKGROUND AND OBJECTS OF THE INVENTION

This invention relates to improvements in a fixture for firmly supporting a golf club or iron in a predetermined alignment with respect to the fixture to facilitate checking and adjustment of the loft and lie angles of the club in accordance with the requirements of a specific golfer.

The geometry and nomenclature of the parts of golf clubs are well known to the art, but are briefly reviewed for the sake of reference herein. A typical set of irons includes nine clubs numbered #1 through #9, a pitching wedge, and a sand wedge. Each club comprises a shaft interfitted at its lower end coaxially with a hosel that merges downwardly with a neck, which in turn merges outwardly with the club head. The latter has a heel that merges upwardly with the neck and outwardly in a rounded edge with a bottom sole which merges at an outwardly and upwardly rounded edge with a toe. The head also has a plane forward face bounded by the neck, heel, sole, toe, and a top edge that extends from the toe to the neck. The face has a plurality of parallel score lines thereon and, when the score lines are horizontal and the axis of the hosel is contained in a vertical plane parallel to the score lines, that axis intersects the horizontal at a lie angle and the plane of the face intersects said vertical plane at a loft angle, and typically, any plane normal to the score lines intersects the sole along a horizontal line.

Although the loft and lie angles may vary slightly between clubs of different brand names, a standard referred to herein is unofficially recognized by some of the major golf club manufacturers wherein the loft angle increases 4° between successively numbered clubs, starting at 17° for the #1 iron, except that the loft angle differs by only 3° between the #2 and #3 irons and between the #3 and #4 irons, and wherein the lie angle increases 1° between successively numbered irons, starting at 56° for the #1 iron, except the lie angle for the #8 and #9 irons is 63° and the lie angle for the pitching and sand wedges is 64°.

Various fixtures known heretofore for use in adjusting the loft and lie angles clamp the face and rear surface of the club head at a predetermined position between clamping jaws or shoes whereby the loft and lie angles are compared to a reference angle and the hosel is then bent with a suitable tool similar to a pipe or rod bending tool to effect the desired adjustment. Usually the club head is clamped with its plane face in a vertical reference plane, (or sometimes a horizontal reference plane) from which the angle of the club shaft is measured and adjusted, but without reference to any standard loft and lie angle.

The club is then removed from the fixture, tested in use to determine if the adjustment was adequate. If the adjustment was not adequate, the procedure is repeated until the club is satisfactory. A difficulty encountered with such fixtures is the almost impossibility of clamping the club a second time at the same position as the first, so that the second adjustment, if required, may render the club less satisfactory than before. Also the hosel cannot withstand many adjustemtns without being damaged or being bent irreparably out of shape. Also with the face of the club clamped in a horizontal or vertical plane, it is difficult or impossible to visualize the club in its normal operating position during the adjustment.

The wide variety of shapes for the different club heads in a set of irons, as well as the different shapes of comparable irons provided by different manufacturers, causes difficulty in clamping all club heads by means of any single fixture available heretofore, and especially between ordinary parallel clamping jaws. Thus, in order to clamp heads of various shapes between the same pair of clamping jaws, and to hold the head firmly against movement during a bending adjustment of the hosel, such extreme clamping force is required that permanent indentations are often forced into the head by the clamp. Such damage to the head can be avoided by removing the club from the fixture after measurement of the loft and lie angles, then adjusting these angles by bending the hosel and then replacing the head in the fixture to determine the extent of the adjustment. However such a procedure is obviously laborious and unsatisfactory and as aforesaid the difficulty of repeatedly clamping the head at the same angle or relationship with respect to the measuring device makes an accurate adjustment impossible.

An object of the present invention is to provide an improved golf club clamping fixture which enables the head of an iron to be readily clamped firmly, positively and repeatedly in the same angular relationship with respect to the fixture and a protractor device thereon for determining the loft and lie angles, with the club in an operative position whereat the plane of the face is at the standard loft angle and the axis of the shaft is at the lie angle.

Another object is to provide such a fixture that is readily adjustable to various standard loft angles and which is cooperable with improved protractor means engageable with the shaft clamped in the fixture for directly determining the lie angle and the deviation of the club face from the standard loft angle.

Other objects are to provide such a fixture having a plane indexing surface that is precisely adjustable to each of the standard loft angles and associated with improved aligning and clamping means for clamping the head of an iron (with its face flush with the indexing surface and with the score lines horizontal) sufficiently rigidly to enable bending adjustment of the hosel, and to provide such a fixture wherein the clamping means includes a fixed shoe for supporting the club head in predetermined and readily repeatable alignment with respect to the indexing surface and protractor means, wherein the clamping means also includes an improved second shoe movable in a clamping action parallel to the indexing surface and having a rounded cam arranged to engage the top edge of the head tangentially in a cam action for camming the head into clamping engagement with both the fixed shoe and the indexing surface.

Still another important object is to provide such a fixture wherein the fixed shoe engages the sole of the head at an acute angle with respect to the indexing surface to cam the head against the latter surface during the clamping action, and wherein the mounting for the second shoe enables limited lost motion for the latter shoe during the clamping action, such that as its rounded cam engages the inclined top edge of the head at any of the typical angles associated with the various types and makes of clubs, the cam portion readily adjusts itself with respect to both the thickness and the angle of the top edge to effect the desired camming and clamping action.

Other and more specific objects are to provide such a fixture wherein the fixed shoe is shaped to engage the head at and only at the two locations of the rounded upturned ends of the sole that merge with the toe and heel respectively, such that when the score lines are horizontal, the head will be in a predetermined position that can be readily and accurately relocated as often as desired; wherein the rounded cam engages the top edge at a predetermined location adjacent its mid-region between the toe and neck in cooperation with the lower fixed shoe to effect a three point clamping engagement that positively secures the head in a predetermined fixed position and enables the bending adjustment with a minimum of clamping force, thereby to avoid deformation of the head; wherein the indexing surface is adjusted to various standard loft angles by swinging about a horizontal pivot axis parallel to and adjacent a vertical plane that contains the lower most portion of the face and is parallel to the score lines when the club head is clamped in the aforesaid predetermined alignment; wherein the plane of the indexing surface at its various positions of angular adjustment is adjacent and parallel to its horizontal pivot axis; wherein the protractor means comprises an assembly mounted to swing about a vertical axis near the last named vertical plane toward and from the latter plane and also to move radially toward and from the vertical axis, the protractor assembly including a loft angle indicator having a shaft engaging surface and adapted to swing about said vertical axis to a position adjacent and parallel to said vertical plane into engagement with a portion of the club shaft adjacent the hosel when the club head is clamped in said predetermined alignment, the loft angle indicator being also pivotal from the vertical plane about a horizontal pivot axis to a position flush with the shaft portion to indicate the latter's deviation from the standard loft angle; and wherein the protractor assembly also includes a straight edge lie angle indicator pivotally mounted on the loft angle indicator for swinging into engagement with a second portion of the club shaft adjacent the hosel about an axis normal to both the horizontal pivot axis of the loft angle indicator and the axis of the hosel when the plane surface of the loft angle indicator is parallel to the latter axis, thereby to enable alignment of the lie indicator edge with the second shaft portion to determine its lie angle.

The top edge of the head for some clubs is so steeply inclined from the neck to the toe that the clamping action tends to cam the head out of its predetermined alignment within the fixture. Also the loft angle of the so called long irons #1 through #4 is so small that such clubs sometimes move out of alignment within the fixture during adjustment of the lie angle. It is accordingly another object to provide such a fixture having a toe stop readily adjustable where required to engage the toe of an iron in the fixture to prevent movement of the iron during adjustment of the lie angle, thereby to enable retention of the iron in the fixture with a minimum of clamping force.

Other objects of this invention will appear in the following description and appended claims, reference being had to the accompanying drawings forming a part of this specification wherein like reference characters designate corresponding parts in the several views.

FIG. 1 is a perspective view of a fixture embodying the present invention, showing a golf iron clamped thereby.

FIG. 2 is a fragmentary enlarged view from the front with portions broken away, taken in the direction of the arrows substantially along the broken line 2—2 of FIG. 1.

FIG. 3 is a fragmentary side view taken in the direction of the arrow 3 of FIG. 2.

FIG. 4 is a fragmentary section taken in the direction of the arrows substantially along the line 4—4 of FIG. 3.

FIG. 5 is a diagrammatic view showing the arrangement of the indexing plane.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawing, a fixture embodying the present invention comprises a flat base plate 10 of rectangular section adapted to be clamped in a 4 inch bench vice, by way of example, or alternatively, to be bolted to the top of a sturdy work bench by virtue of the bolts holes 11 therethrough. A boss or anchor block 12 integral with the top surface of the plate 10 is provided with a horizontal plane top surface and a vertical plane rear surface that intersect along a transverse sighting line or edge 14 by means of which a score line 15 on the face 16 of a golf club head 13 can be aligned horizontally as described below.

A pair of parallel guide arms 17 spaced by the block 12 are pivotally secured thereto by a transverse horizontal pivot pin 18 for swinging in a vertical plane about an axis parallel to the edge 14. The rear or underside of the arms 17 define a plane indexing surface 19 parallel to the axis of pin 18, i.e. the pivot axis of the arms 17. The upper ends of the arms 17 are spaced by an integral block 20. One of the arms 17 extends endwise beyond the block 20 and is provided with a transverse indexing hole 21.

An indexing arm 22 is provided with a plurality of indexing holes 23 selectively alignable with the hole 21 and pivotally mounted at its lower end on a boss 24 by a pivot pin 25. The latter is parallel to the pin 18 and spaced therefrom to define the base of a triangle. The boss 24 is integral with the upper surface of the plate 10.

The indexing holes 23 are preferably spaced along the arm 22 so that when each in turn is aligned with the hole 21, the indexing surface 19 will be at one of each of the standard loft angles for a set of golf irons #1 through #9, the pitching wedge and sand wedge. Accordingly the numbers 1 through 9, P and S may be marked on the arm 22 adjacent the indexing holes 23 associated with the loft angles of the correspondingly numbered irons. Obviously P and S represent the pitching and sand wedges respectively. The alignment between the indexing hole 21 and any one of the indexing holes 23 is releasably secured by a pin 26 having a knurled head and adapted to fit snugly in the aligned holes, thereby to effect a rigid triangle defined by the arms 17, 22 and base 10.

Rigidly secured to the base 10 adjacent to and rearwardly of the indexing surface 19, as for example by bolts 27, is a fixed lower clamping shoe or jaw 28 which extends generally parallel to the pivot axis 18. The top surface of the shoe 28 is recessed sufficiently at 29 between its ends 29a and 29b to accommodate the most exaggerated rocker sole 31 likely to be provided for a typical club head 13. From front to rear, the top surfaces of the ends 29a and 29b are horizontal and thus meet the plane indexing surface 19 (when adjusted to any standard loft angle) at an acute angle. The interior edges of the ends 29a and 29b are slightly rounded at 30a and 30b and merge with the central recess 29 to provide two spaced supports for the sole 31 adjacent the rounded merger of the sole with the heel 32 and toe 33 respectively, FIG. 2. The edge 30b is higher than the edge 30a because the merger of the sole with the toe usually defines a more extensive arc than the merger of the sole with the heel. Thus the elevated edge 30b with respect to edge 30a usually meets a midregion of the arc of merger between the sole 31 and toe 33 and provides effective resistance to force urging leftward movement of the head 13 in FIG. 2 during the clamping action in consequence of the inclined top edge 34, as described below.

Mounted between the arms 17 for sliding therealong is an upper shoe 35 having a pair of lateral shoulders 36 loosely engageable with the two parts of the indexing surface 19 defined by the two arms 17 respectively and adapted for limited lost motion toward and from the associated surfaces 19 by means of approximately a sixteenth of an inch clearance 37. The body of the shoe 35 between the arms 17 extends from front to rear a distance slightly greater than the corresponding distance between the indexing surface 19 and the parallel plane forward guide surface 38 defined by the forward or upper surfaces of the arms 17, thereby to effect the aforesaid lost motion clearance or spacing 37, FIG. 3. Similarly the width of the body of shoe 35 between the parallel arms 17 is approximately a sixteenth of an inch less than the lateral spacing of the arms 17, thereby to effect a limited lateral clearance 37a and lost motion for the shoe 35 between the arms 17. The clearances 37 and 37a thus enable limited universal movement of the upper shoe during the clamping operation, as described below.

A transverse plate 39 overlaps the two portions of the plane surface 38 of the arms 17 respectively and is rigidly secured to the forward end of the shoe 35 by a stud bolt 40 and nut 41. The lower rear end of bolt 40 comprises a spring retaining extension secured to the lower end of a tension spring 42 which yieldingly urges the shoe 35 upwardly along the arms 17. The upper end of the spring 42 is secured under tension at 43 to the rear end of block 20 to urge the shoe 35 upwardly. The block 20 is also provided with a threaded bore having an axis parallel to the arms 17. A worm shaft 44 extends in screw relationship coaxially through the latter bore and engages at its lower end the upper surface of the shoe 35 to oppose the tension of spring 42. A handwheel 45 having a hexagonal nut head is secured to the upper end of the shaft 44 for rotating the latter to clamp and unclamp the shoe 35 against the top edge 34 of the club head 13. The final clamping force can be applied to the nut head by a wrench.

The lower portion of the shoe 35 comprises an integral ball-like cam 46 rounded in three dimensions and shaped to engage the top edge 34 at an acute angle with respect to the surface 19 and cam the club head 13 downwardly toward the fixed shoe 28 and simultaneously toward the surface 19 when the worm 44 is screwed downwardly in the clamping action. As illustrated in FIG. 2 the cam 46 is shaped and located with respect to the lower shoe 28 so as to engage the top edge 34 tangentially approximately midway between the sole engaging edges 30a and 30b somewhat to the left of the mid-region of the face 16. In a plane parallel to the indexing surface 19, the contour of the cam 46 adjacent its region of engagement with the top edge 34 comprises a circle 46a, when viewed at right angles to the indexing surface 19, FIG. 2, and a circle 46b in a plane transverse to the arms 17 when viewed parallel to the surface 19, FIG. 4, of several inches radius, say 4 to 6 inches.

The circle 46a is centered on a line approximately normal to the top edge 34 of a typical intermediate iron, as for example a #6 iron. The exact location of the center is not critical because of the aforesaid lost motion mounting of the shoe 35 that enables considerable adjustment to accommodate engagement with irons ranging from #1 through the sand wedge. The circle 46b is centered approximately on a line normal to the indexing surface 19. The fairly large radius of curvature in each instance prevents an excessive localized concentration of clamping force that might deform the top edge 34. In a vertical plane normal to the indexing surface 19, the contour of the cam 46 adjacent its region of engagement with the top edge 34 comprises a line 46c inclined at an acute angle with respect to the indexing surface 19, thereby to wedge the top edge 34 downwardly toward the lower shoe 28 and forwardly toward the indexing surface 19, FIG. 3.

In operation of the structure described thus far for measuring and adjusting any typical iron, the angle of the arms 17 is first adjusted to the standard loft angle of the iron to be measured by indexing the appropriate hole 23 with the hole 21 and thereafter securing the arms 17 and 22 together by the pin 26. The sole 31 of the club is then seated on the supports 30a and 30b of the lower shoe 28 while the plane forward face 16 of the head 13 is held flush with the indexing surface 19 by manual pressure. The head 13 is adjusted on the lower shoe 28 until the score line 15 most conveniently alignable by sight with the horizontal edge 14 is moved into alignment with that edge by sighting along the top surface of the block 12. The head 13 is then held firmly in its aligned position until the upper shoe 35 is moved tightly into clamping engagement with the top edge 34 by manual turning of wheel 45 to screw the worm shaft 44 downwardly.

As the cam 46 first engages the inclined top edge 34, one side or the other of the eventual point of clamping engagement of the cam 46 will usually touch the top edge 34 first, causing the cam 46 and shoe 35 to slide and rock slightly to its final position of clamping engagement. Thus with a top edge 34 inclined with respect to the angular bias of the arc 46a as illustrated in FIG. 2, the arc 46a rightward of the final point of clamping engagement will initially strike the edge 34, causing the cam 46 to slide and rock to the cocked position shown. Similar rocking and sliding action occurs with respect to the lines 46b and 46c. The cam thus automatically seeks its position of optimum frictional and clamping engagement with the edge 34, within the limits of its lost motion movement, as the worm 44 turns in the clamping action.

In a few situations particularly involving the long irons #1 – #4 for example having a flat loft, or some wedges having an excessively inclined top edge 34, auxiliary support might be required to hold the club head 13 in the clamped position during bending adjustment of the hosel 49. Accordingly a toe stop 47 is provided comprising a bolt adjustably screwed into the shorter arm 17 for moving an enlarged knurled head of the bolt parallel to the face 16 into endwise abutment with the toe 33, thereby to prevent leftward or upward movement of the latter. Usually finger force will be adequate to clamp the stop 47 against the toe 33 to prevent its movement and in most instances the stop 47 is not required.

Likewise the lost motion adjustability of the cam 46 accommodates its wearing with repeated use. Eventually the surfaces 46a, b, c wear or set in, so to speak, to provide a cam surface that approximately matches the most commonly encountered top edges 34. Thereafter the rate of wear decreases. In the latter regard, the material of the shoes 28 and 35, though relatively hard and rigid, is preferably softer than the steel head 13 of the golf iron to prevent damage to the head. Copper or zinc alloys known to the art are satisfactory. The other parts of the fixture described so far may comprise steel castings or suitable pieces of steel plate and bar stock welded together. The screw threaded portions may be case hardened. The protractor assembly to be described below may comprise any suitable form sustaining material. A light weight aluminum alloy is staisfactory.

By virtue of the structure described, when a head 13 having a standard loft angle is clamped in the predetermined alignment described, i.e., with the face 16 flush with the indexing surface 19 at the standard loft angle and with the score lines 15 horizontal, the axis of the shaft 48 or hosel 49 will lie in a vertical plane parallel to the score lines and will intersect the horizontal at the lie angle which can thus be readily measured. If the loft angle of the head 13 in the fixture is not standard, the angular deviation of the hosel axis from a vertical plane parallel to the score lines can also be readily measured to determine the deviation of the loft angle from the standard. The vertical position of the head 13 clamped at the aforesaid predetermined alignment will not affect the angular relation of the loft and lie angles with respect to the indexing face 19, regardless of the location along the latter at which the head 13 is clamped between the shoes 28 and 35.

Measurement of deviation from a standard loft angle is preferably made with respect to a fixed vertical reference plane by the protractor assembly described below. Typically the club shaft 48 is cylindrical adjacent the hosel 49 which merges with the neck 50 such that the leading edge of the adjacent cylindrical portion of the shaft 48 a few inches above the hosel 49 lies in or close to a vertical plane 51 in FIG. 5 that is parallel to the score lines 15 and intersects the bottom most portion of the face 16 when the latter is at its loft angle with the score lines 15 horizontal. Accordingly the plane 51 may be used as a reference plane. The horizontal plane 52 contains the bottom most portion of the face 16 or sole 31 and intersects the plane 51 at the pivot axis 18. Thus with any head 13 supported at the elevation of plane 52 with the bottom most portion of the face 16 located in plane 51, in the predetermined alignment with the score lines 15 horizontal and the face 16 at the loft angle, the indexing surface 19 pivotal at 18 will swing into coincidence with the face 16 having any loft angle.

Because of variations between different clubs, the fixed lower shoe 28 might not support the bottom most portion of the face 16 exactly at the intersection of the planes 51 and 52, but any deviation will be slight and the determination of the loft and lie angles as described below will not be significantly affected. Similarly for structural convenience, the pivot axis 18 can be moved from the position illustrated in FIG. 5 without significantly affecting the accuracy of measurements by the protractor assembly described below.

By way of example, if the pivot axis 18 is moved to a location 18a whereat the angle of the indexing surface 19 coincides with the standard loft angle for both a #2 iron and the pitching wedge, it will conform sufficiently closely to all intermediate loft angles (of heads 13 in the predetermined alignment when the lower most portion of the face 16 is in the plane 51 along axis 18) so that no significant error will occur in the determination of the loft and lie angles. The standard loft angles 21° and 51° for the #2 iron and pitching wedge respectively are identified in FIG. 5 and intersect along the axis 18. If the pivot axis 18 is moved to 18a, which is located a distance D measured perpendicularly from both the 21° and 51° lines, an indexing surface 19 that coincides with the 21° line and is pivotal at 18a will also pivot into coincidence with the 51° line and will pass through the axis 18 at both loft angles 21° and 51°. The surface 19 will also pass very close to the preferred axis 18 when pivoted to any intermediate loft angle, as well as the adjacent 17° and 55° angles for the #1 iron and sand wedge.

The protractor assembly for measuring the lie angle and deviation from the loft angle comprises a horizontally swinging bracket 54 secured to the upper end of a vertical rod 55 rotatably mounted on a fixed bracket 56 for turning about a vertical axis in the plane 51 of FIG. 5. The bracket 56 is suitably secured rigidly to plate 10. A horizontal extension 57 of bracket 54 provides a track for a horizontally slidable carriage 58 rigidly secured at its outer end to a vertical bracket 59. The latter has a vertical plane face 60 perpendicular to the plane 51 when the track 57 and carriage 58 are swung about the axis of rod 55 into parallelism with plane 51.

Pivotally mounted on the lower end of the face 60 for swinging about a horizontal pivot axis 61 perpendicular to the plane of 60 is a loft angle indicator 62, FIG. 3, having a plane face 63 perpendicular to the face 60. When the face 60 is perpendicular to plane 51, the plane of face 63 when vertical is preferably in or adjacent the plane 51 of FIG. 5. When a golf club having a standard loft angle is secured in the fixture in the aforesaid predetermined position of alignment, with the bottom of the sole 31 or the lower most portion of the face 16 at the level of plane 52 in FIG. 5, and with the score lines 15 horizontal and the plane of the face 16 at the standard loft angle for the club being measured, the leading edge of the cylindrical portion of the shaft 48 a few inches above the hosel 49 will lie in or close to the plane 51 and the plane of face 63 can be swung about pivot 61 into parallel engagement with the adjacent edge of the aforesaid cylindrical portion of shaft 48.

If the club being measured does not have the standard loft angle, the plane of face 63 in parallel engagement with the shaft 48 will meet the vertical plane 51 at an angle equal to the deviation of the club's loft angle from the standard. A pointer 64 at the upper end of the loft indicator 62 cooperates with indicia on the face 60 to register such deviation. The parts described are dimensioned so that the face 63 engages the shaft 48 a few inches above the hosel 49 where the shaft 48 is usually cylindrical, and the pivotal rod 55 is located at least approximately ten inches from the region of engagement between the shaft 48 and face 63, so that the swinging movement of face 63 about the axis of rod 55 will be essentially perpendicular to the plane 51 throughout the small angles involved if the loft angle is not standard. If desired, instead of mounting the bracket 59 for swinging about the axis of rod 55, the bracket 59 may be mounted on a carriage for moving horizontally along a track toward and from the plane 51, similarly to 57,58. The pivotal track 57 enables the protractor assembly to be swung out of the way while a club head 13 is being aligned within the fixture.

Pivotal on the face 63 for swinging about an axis 65 perpendicular to the plane of face 63 is a lie angle indicator 66. The latter has a pair of footings 67 arranged to determine a straight line or edge and to engage the side of shaft 48 adjacent to and at right angles to the portion of the shaft 48 engaged by plane 63. In this regard, when the plane 63 is moved into parallel engagement with the shaft 48, the carriage 58 can be moved along track 57 until both footings 67 engage the shaft 48 and swing the indicator 66 about pivot 65 to an angle corresponding to the lie angle of the club clamped by the fixture in the aforesaid predetermined alignment. The upper end of the indicator 66 comprises a pointer 69 cooperable with indicia on the face 63 to indicate the lie angle directly.

I claim:

1. In a fixture for use with a typical golf club known as an iron having a head connected to a hosel interfitting coaxially with the lower end of a shaft, the head comprising a plane forward face having a plurality of parallel horizontal score lines thereon and terminating outwardly at a toe spacing a bottom sole and a top edge, the combination of a guide having an indexing surface defining a plane for receiving said head to position said forward face in a predetermined angular alignment with respect to said fixture with said face flush with said surface, horizontal indexing means for providing a reference line capable of visual alignment with a parallel portion of one of said horizontal score lines to enable the positioning of the score lines of said head in alignment with said reference line, and clamping means for clamping said head in a fixed position in said fixture after said head has been placed in a properly aligned position.

2. In the combination according to claim 1, said clamping means including means for effecting a three point clamping engagement with said head in said aligned position comprising a lower shoe having two sole engaging portions at two locations respectively spaced at least by the distance along said sole between its merger with the heel and toe, and upper shoe having a top edge engaging portion at a location approximately mid-way between said sole engaging locations, said shoe portions being movable toward and away from each other in a plane parallel to said indexing surface and being shaped for camming said face toward said indexing surface upon relative clamping movement of said shoes toward each other.

3. In the combination according to claim 2, said clamping means including means supporting said lower shoe at a fixed position, means supporting said upper shoe for the clamping movement parallel to said indexing surface and toward said lower shoe, and means for effecting said clamping movement of said upper shoe.

4. In the combination according to claim 3, said top edge engaging portion of said upper shoe comprising a cam surface adapted to overlie said top edge at an acute angle with respect to the plane of said indexing surface for camming said top edge toward both the latter plane and said lower shoe, said cam surface being convex to said top edge in said aligned position for engaging said top edge tangentially in said clamping relationship.

5. In the combination according to claim 4, means for accommodating the convex cam surface of said upper shoe to said top edge at various angles with respect to the horizontal comprising lost motion means for enabling limited lateral movement of said cam surface during said clamping movement into said clamping relationship with the top edge.

6. In the combination according to claim 3, means pivotally supporting said guide for swinging about a pivot axis adjacent said lower shoe and parallel to said score lines in said aligned position, and means for selectively securing said guide with its indexing surface at each of a plurality of angles with respect to a horizontal plane corresponding to different loft angles.

7. In the combination according to claim 6, said means for selectively securing comprising a bracket, means for pivotally supporting said bracket for swinging about a pivot axis parallel to and spaced from the first named pivot axis to a plurality of predetermined angles with respect to a horizontal plane corresponding to said different loft angles, and indexing means cooperable with said guide and bracket for selectively securing the same together at said predetermined angles.

8. In the combination according to claim 7, one of the members comprising said guide and bracket having a pin retaining hole and the other of said members having a plurality of pin retaining holes selectively alignable in turn with the first named pin retaining hole when said members are located in turn at said predetermined angles, said indexing means comprising a pin selectively engageable with said members within the aligned pin retaining holes when said members are at said predetermined angles.

9. In the combination according to claim 1, protractor means for determining the angular deviation of the shaft from a vertical plane intersecting the plane of the face at a standard loft angle when said face is in said aligned position, said protractor means comprising a first arm having a plane loft determining surface adapted at a position parallel to said vertical plane to engage in parallellism a portion of the shaft adjacent the hosel and parallel to the hosel axis when said face in said aligned position has said standard loft angle, means mounting said arm for predetermined movement toward and from said vertical plane and also for pivoting about a horizontal axis for swinging the loft determining surface into parallelism with said shaft portion by engagement therewith when the latter is not parallel to said vertical plane.

10. In the combination according to claim 9, second protractor means for determining the lie angle of the head in said aligned position comprising a second arm having spaced lie determining portions defining a straight line and engageable in parallelism with a second portion of said shaft adjacent said hosel and parallel to the hosel axis, said means mounting the first arm also comprising means supporting said first arm for predetermined movement transversely of the first named predetermined movement of said first arm, and means pivotally mounting said second arm on said first arm for swinging about an axis normal to said horizontal pivot axis for the first arm.

11. In the combination according to claim 10, means pivotally supporting said guide for swinging about a pivot axis parallel to said score lines when the head is in said aligned position, and means for selectively securing said guide with said indexing surface at each of a plurality of angles with respect to a horizontal plane corresponding to different loft angles.

12. In the combination according to claim 11, said clamping means comprising a lower shoe fixed with respect to the pivot axis for said guide for clamping against said sole in said aligned position, and an upper shoe movable parallel to said indexing surface toward said lower shoe for clamping against the top edge of the head, the pivot axis for said guide being located adjacent and parallel to the intersection between said indexing surface and said vertical plane when said indexing surface is adjacent both the maximum and minimum loft angles of a typical set of golf clubs.

13. In the combination according to claim 1, said clamping means comprising upper and lower shoes engageable with said top edge and sole respectively in said aligned position and mounted for relative movement toward each other parallel to said indexing surface for clamping said head therebetween, said clamping means including means for enabling clamping alignment of said upper shoe with said top edge comprising lost motion means supporting said upper shoe for limited lateral movement with respect to said guide.

14. In the combination according to claim 13, the portion of said upper shoe engageable with said top edge being shaped for camming said top edge toward both the latter surface and lower shoe, the last named portion being also convex for engaging said top edge tangentially in said clamping relationship.

15. In the combination according to claim 14, means for supporting said lower shoe in fixed relationship with respect to said indexing surface, said clamping means including means for effecting a three point clamping engagement with said head in said aligned position commprising spaced portions of said lower shoe engageable with said sole adjacent only said toe and heel respectively, and a portion of said upper shoe engageable in said clamping relationship only with a mid-region of said top edge.

* * * * *